United States Patent
Gellert et al.

(10) Patent No.: US 6,270,711 B1
(45) Date of Patent: Aug. 7, 2001

(54) INJECTION MOLDING APPARATUS HAVING A MELT BORE THROUGH THE FRONT END OF THE PIN

(75) Inventors: Jobst Ulrich Gellert, Georgetown; Denis L. Babin, Acton, both of (CA)

(73) Assignee: Mold-Masters Limited, Georgetown, Ontario (CA)

( * ) Notice: Subject to any disclaimer, the term of this patent is extended or adjusted under 35 U.S.C. 154(b) by 0 days.

(21) Appl. No.: 09/215,389

(22) Filed: Dec. 18, 1998

Related U.S. Application Data (62) Division of application No. 08/969,754, filed on Nov. 13, 1997, now Pat. No. 5,935,615.

(30) Foreign Application Priority Data

Oct. 23, 1997 (CA) .................................................... 2219247

(51) Int. Cl.[7] .................................................... B29C 45/16
(52) U.S. Cl. ................. 264/255; 264/328.8; 264/328.14; 264/334; 425/130
(58) Field of Search ................................ 264/255, 328.8, 264/328.15, 334; 425/130, 562, 564, 570, 572

(56) References Cited

U.S. PATENT DOCUMENTS

| | | | |
|---|---|---|---|
| 4,717,324 | 1/1988 | Schad et al. | 425/130 |
| 4,789,318 | 12/1988 | Ehritt | 425/130 |
| 4,808,101 | * 2/1989 | Schad et al. | 425/130 |
| 4,957,682 | * 9/1990 | Kobayashi et al. | 264/255 |
| 4,990,301 | * 2/1991 | Krishnakumar et al. | 264/513 |
| 5,374,178 | 12/1994 | Nakayama | 425/130 |
| 5,914,318 | 6/1999 | Swenson | 425/130 |

* cited by examiner

*Primary Examiner*—Jan H. Silbaugh
*Assistant Examiner*—Suzanne E. McDowell
(74) *Attorney, Agent, or Firm*—Foley & Lardner (57) ABSTRACT

Multi-cavity injection molding apparatus for three layer molding having elongated pins for fixed pin gating or valve gating. Each elongated pin has a central melt bore extending rearwardly from its front end to a number of laterally extending bores. A low viscosity barrier material such as EVOH or nylon flows through these bores to the gate leading to the cavity. This allows coinjection with fixed pins and sprue gating in one embodiment and by valve gating in another embodiment.

20 Claims, 9 Drawing Sheets

INJECTION MOLDING APPARATUS HAVING A MELT BORE THROUGH THE FRONT END OF THE PIN

This is a divisional of application Ser. No. 08/969,754 filed Nov. 13, 1997, now U.S. Pat. No. 5,935,615.

BACKGROUND OF THE INVENTION

This invention relates generally to multi-cavity injection molding apparatus for three layer molding and more particularly to such apparatus wherein an elongated pin extending through a central melt channel in each heated nozzle has a central melt bore extending rearwardly from its front end.

Multi-cavity injection molding apparatus for making three layer protective containers for food or preforms or parisons for beverage bottles are known. One layer of a barrier material such as ethylene vinyl alcohol copolymer (EVOH) or nylon is molded between two layers of a polyethylene terephthalate (PET) type material. In some multi-cavity apparatus the two different melts are distributed through a single melt distribution manifold having two melt passages, but preferably for materials such as these having different injection temperatures of about 400° F. and 565° F. respectively, the two melts are distributed through two different melt distribution manifolds. In some cases, the two melts are injected sequentially, while in other cases both coinjection and sequential injection are utilized. The two melts are both injected through a heated nozzle having a central melt channel and an annular melt channel extending around the central melt channel to a gate leading to the cavity.

As seen in U.S. Pat. No. 4,717,324 to Schad et al. which issued Jan. 5, 1988, valve gated apparatus has been used for three layer molding. However, that apparatus has the disadvantage that it does not disclose sprue gating apparatus and also that the valve gated apparatus does not teach simultaneous or coinjection of the two melts.

SUMMARY OF THE INVENTION

Accordingly, it is an object of the present invention to at least partially overcome the disadvantages of the prior art by providing multi-cavity injection molding apparatus for three layer molding which allows sprue gating with fixed pins and simultaneous or coinjection by valve gating.

To this end, in one of its aspects, the invention provides multi-cavity injection molding apparatus for three layer molding having one or more melt distribution manifolds with a front face and a plurality of heated nozzles mounted in a mold. Each heated nozzle has a rear end abutting against the melt distribution manifold and a front end adjacent a gate leading to a cavity in the mold. Each heated nozzle has a central melt channel extending therethrough from the rear end to the front end and one annular melt channel extending around the central melt channel to the front end. An elongated pin having a rear end, a front end and an outer surface extends in the central melt channel in each heated nozzle in alignment with a gate leading to a cavity in the mold.

A melt passage from melt source branches in the melt distribution manifold and extends through the one annular melt channel in each heated nozzle to the gate. Another melt passage from another melt source branches in the melt distribution manifold and extends along the elongated pin in the central melt channel in each heated nozzle to the gate. Each elongated pin has a central melt bore and one or more lateral melt bores. The central melt bore extends a predetermined distance rearwardly from the front end of the elongated pin to a rear end of the central melt bore. The lateral melt bore extends outwardly from the rear end of the central melt bore to the outer surface of the elongated pin.

In another of its aspects, the invention further provides a method of continuously injection molding three layer products in a multi-cavity injection molding apparatus having a front melt distribution manifold spaced from a rear distribution manifold with a plurality of heated nozzles mounted in a mold. Each heated nozzle has a rear end abutting against the front melt distribution manifold and a front end adjacent a gate leading to a cavity in the mold. Each heated nozzle also has a central melt channel extending therethrough from the rear end to the front end and one annular melt channel extending around the central melt channel to the front end. An elongated pin having a rear end, a front end and an outer surface extends in the central melt channel in each heated nozzle in alignment with a gate leading to a cavity in the mold. The method comprises the steps of injecting a first molten material from a first melt source into the cavities through a first melt passage which branches in the front melt distribution manifold and extends through the annular melt channel in each heated nozzle through the aligned gate. After a predetermined quantity of the first molten material has been injected into the cavities, simultaneously injecting a second molten material from a second melt source into the cavities through a second melt passage which branches in the rear melt distribution manifold and extends along the elongated pin through a bore through the front melt distribution manifold and the aligned central melt channel through each of the heated nozzles and the aligned gates. This forms an inner layer of the second material between two outer layers of the first material in each of the cavities. When the cavities are nearly full, the injection of the second material through the second melt passage is discontinued, while the injection of the first material through the first melt passage is continued until the cavities are full. After a cooling period, the mold is opened and the molded products are ejected. Finally, the mold is closed after ejection of the molded products.

In another of its aspects, the invention further provides a multi-cavity hot runner injection molding apparatus for three layer molding having a front melt distribution manifold and a rear melt distribution manifold mounted in a mold extending substantially parallel to each other with an insulative air space between them. It includes a number of heated nozzles, each having a rear end, a front end, a central melt channel extending therethrough and an annular melt channel extending around the central melt channel to the front end, one or more melt bores extending from the rear end of the heated nozzle to the annular melt channel. The heated nozzles are mounted in the mold with the rear end of each heated nozzle abutting against the front melt distribution manifold. An elongated pin having a rear end, a front end and an outer surface extends in the central melt channel in each heated nozzle in alignment with a gate leading to a cavity in the mold. A number of melt transfer and dividing bushings each having a rear end and a front end and are mounted in openings through the front melt distribution manifold with their rear ends abutting against the rear melt distribution manifold and the front end of each melt transfer and dividing bushing abutting against the rear end of one of the heated nozzles. Each elongated pin has a central melt bore and one or more lateral melt bores. The central melt bore extends a predetermined distance rearwardly from the front end of the elongated pin to a rear end of the central melt bore. The lateral melt bore extending outwardly from the rear end of the central melt bore to the outer surface of the elongated pin. Thus, a first melt passage from a first melt source branches in the rear melt distribution manifold and extends through each melt transfer and dividing bushing and the annular melt channel in each heated nozzle to a gate adjacent the front end of the heated nozzle leading to a cavity in the mold. A second melt passage from a second melt source branches in the front melt distribution manifold and extends through the melt transfer and dividing bushing and along the elongated pin in the central melt channel in each heated nozzle to the gate.

Further objects and advantages of the invention will appear from the following description taken together with the accompanying drawings.

DETAILED DESCRIPTION OF THE INVENTION

Figure 1:
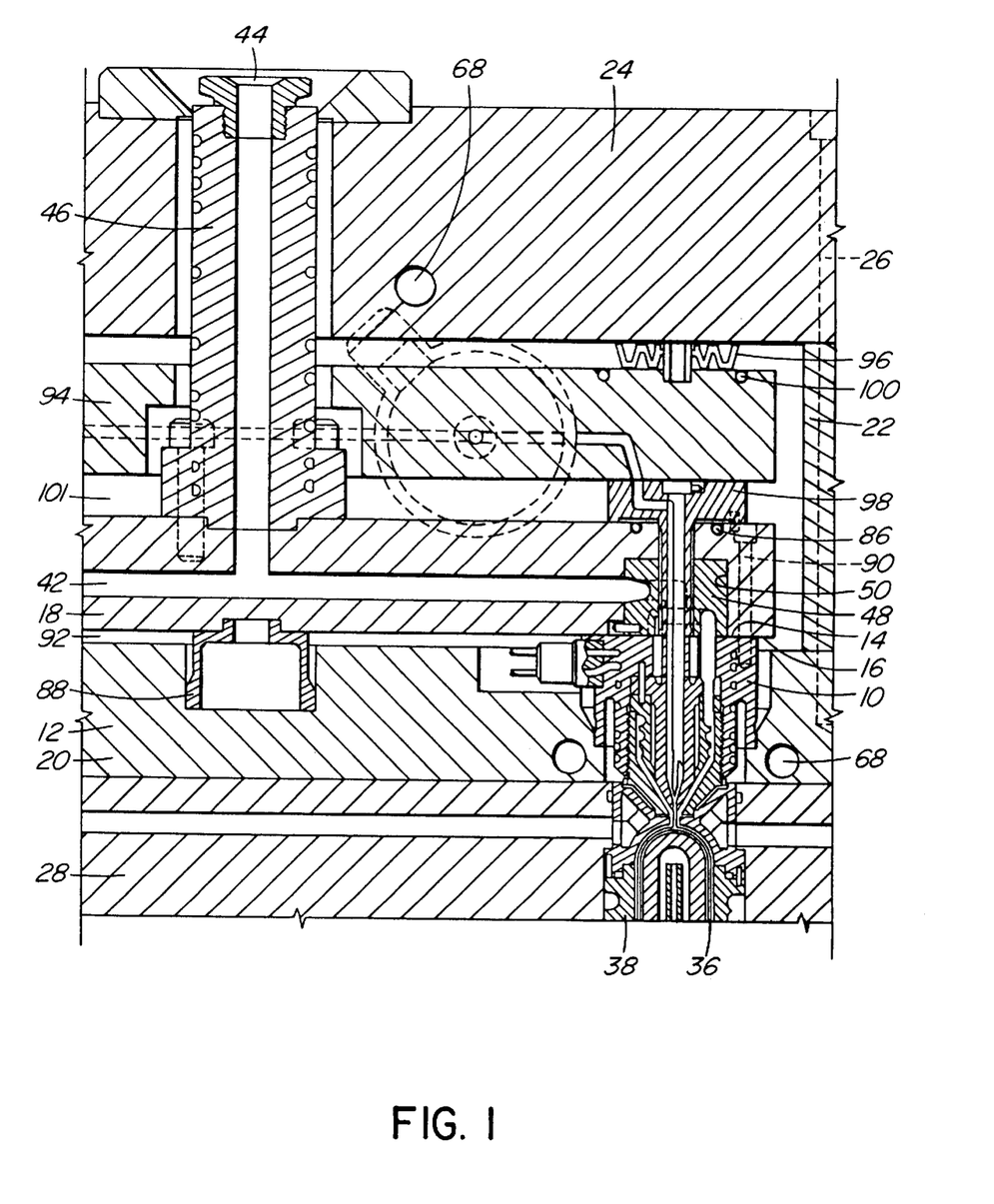
FIG. 1 is a sectional view of a portion of a multi-cavity injection molding apparatus having sprue gating with fixed elongated pins according to one embodiment of the invention.
Figure 2:
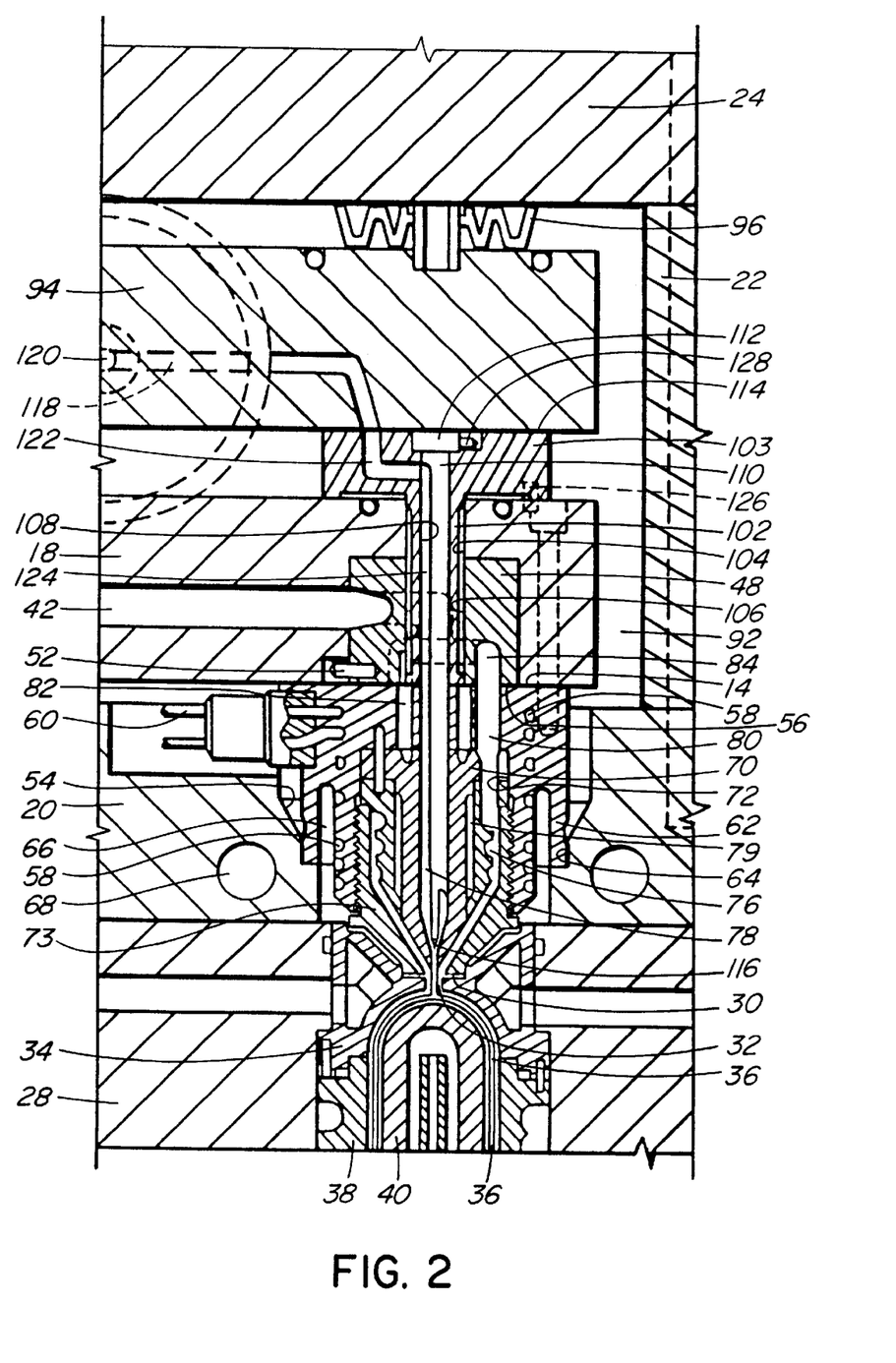
FIG. 2 is an enlarged section of a portion of FIG. 1.

Reference is first made to FIGS. 1 and 2 which show a portion of multi-cavity injection molding apparatus for molding three layer preforms or other products by a combination of sequential and simultaneous coinjection through sprue gates. A number of heated nozzles 10 are mounted in a mold 12 with their rear ends 14 abutting against the front face 16 of a steel front melt distribution manifold 18. While the mold 12 can have a greater number of plates depending upon the application, in this case only a nozzle retainer plate 20, a manifold retainer plate 22 and a back plate 24 secured together by bolts 26, as well as a cavity retainer plate 28 are shown for ease of illustration. The front tip end 30 of each heated nozzle 10 is aligned with a sprue gate 32 extending through a cooled gate insert 34 to a cavity 36. This cavity 36 for making beverage bottle preforms extends between a cavity insert 38 and a mold core 40 in a conventional manner.

One melt passage 42 for the PET extends from an inlet 44 through a cylindrical manifold extension 46 and branches in the front melt distribution manifold 18 to extend through a melt dividing bushing 48 received in a seat 50 in the front face 16 of the front melt distribution manifold 18 to each heated nozzle 10. The melt dividing bushings 48 are retained in proper alignment by small alignment dowels 52 extending into the front melt distribution manifold 18. While only a single heated nozzle 10 is shown for ease of illustration, it is understood that in a typical configuration there will be many heated nozzles 10 (eg. 32, 48 or 64) seated in the mold to receive melt through the melt passage 42 which will have a more complex configuration than that shown.

Each heated nozzle 10 is seated in an opening 54 in the nozzle retainer plate 20 with its rear end 14 abutting against the front end 56 of the melt dividing bushing 48. The heated nozzle 10 is heated by an integral electrical heating element 58 having a terminal 60. A rear collar portion 62 of each heated nozzle 10 is received in a circular locating seat 64 extending around the opening 54. This provides an insulative air space 66 between the heated nozzle 10 and the surrounding mold 12 which is cooled by pumping cooling water through cooling conduits 68. In the configuration shown, each heated nozzle 10 has an insert portion 70 which is secured in a seat 72 by a threaded nozzle seal 73 which is screwed into place and forms the front tip end 30 of the heated nozzle 10. As can be seen, the insert portion 70 is made of several steel pieces 74 which fit together to provide an annular melt channel 76 extending around a central melt channel 78 to the front tip end 30. The insert portion 70 of the heated nozzle 10 also has an annular insulative air space 79 which extends between the central melt channel 78 and the surrounding annular melt channel 76 to provide some thermal separation between them. The central melt channel 78 extends from the rear end 14 of the heated nozzle 10, while the surrounding annular melt channel 76 extends from four spaced melt bores 80 running to the rear end 14 of the heated nozzle 10. A circle of spaced holes 82 are drilled in the rear end 14 of the heated nozzle 10 to extend between the central melt channel 78 and the surrounding spaced melt bores 80 to provide some thermal separation between them. The melt dividing bushing 48 is made of three steel layers integrally brazed together as described in U.S. Pat. No. 6,135,751 entitled, "Injection Molding Apparatus Having Melt Dividing Bushings". As described therein, the PET melt passage 42 divides in the melt dividing bushing 48 and extends through four spaced holes 84 which are in alignment with the four spaced melt bores 80 in the rear end 14 of the heated nozzle 10.

The front melt distribution manifold 18 is heated by an integral electrical heating element 86. It is located by a central locating ring 88 and screws 90 extending into each heated nozzle 10 to have an insulative air space 92 extending between it and the surrounding cooled mold 12. In this configuration, another steel rear melt distribution manifold 94 is mounted in the mold 12 by a number of insulative and resilient spacers 96 extending between it and the back plate 24 to extend parallel to the front melt distribution manifold 18. As can be seen, the two manifolds 18, 94 are separated by thermal insulating melt transfer bushings 98 positioned between them. As described in more detail below, the rear melt distribution manifold 94 is heated by an integral electrical heating element 100 to a lower operating temperature than the front melt distribution manifold 18, and the air space 101 provided by the thermal insulating melt transfer bushing 98 between the two manifolds 18, 94 provides thermal separation between them.

In this configuration, each thermal insulating melt transfer bushing 98 has an elongated stem portion 102 extending forwardly from a rear head portion 103 through a bore 104 in the front melt distribution manifold 18 and a central bore 106 in the melt dividing bushing 48 and accurately retains the melt transfer bushing 98 in place. The melt transfer bushing 98 also has a central bore 108 which extends through the stem portion 102 and receives an elongated pin 110 according to the invention. The elongated pin 110 also extends through the central melt channel 78 in the heated nozzle 10. As described in more detail below, the elongated pin 110 is fixed in place with its head 112 seated in the rear face 114 of the rear head portion 103 of the melt transfer bushing 98 and its partially tapered front end 116 adjacent to and in alignment with the gate 32.

A separate melt passage 118 for the barrier material extends from another inlet 120 and branches in the rear melt distribution manifold 94 to extend through an L-shaped passage 122 drilled in the rear head portion 103 of each melt transfer bushing 98 to a longitudinal groove 124 machined to extend a predetermined distance rearwardly in each fixed pin 110. In other embodiments, the groove 124 can extend helically around the fixed pin 110 or the fixed pin 110 can be small enough to let the barrier material flow around it. However, in view of the relatively low volume and low viscosity of the barrier material, it is preferable to have the fixed pin 110 fit in the bore 108 in the melt transfer bushing 98 and the central melt channel 78 in the heated nozzle 10 and provide the elongated or helical groove 124 in each fixed pin 110 for the barrier material to flow through. Each melt transfer bushing 98 is mounted in proper alignment by a small dowel 126 which extends between it and the front melt distribution manifold 18. The fixed pin 110 is similarly kept in proper alignment by a small dowel 128 extending from its head 112 into the surrounding rear head portion 103 of the melt transfer bushing 98.

Figure 3:
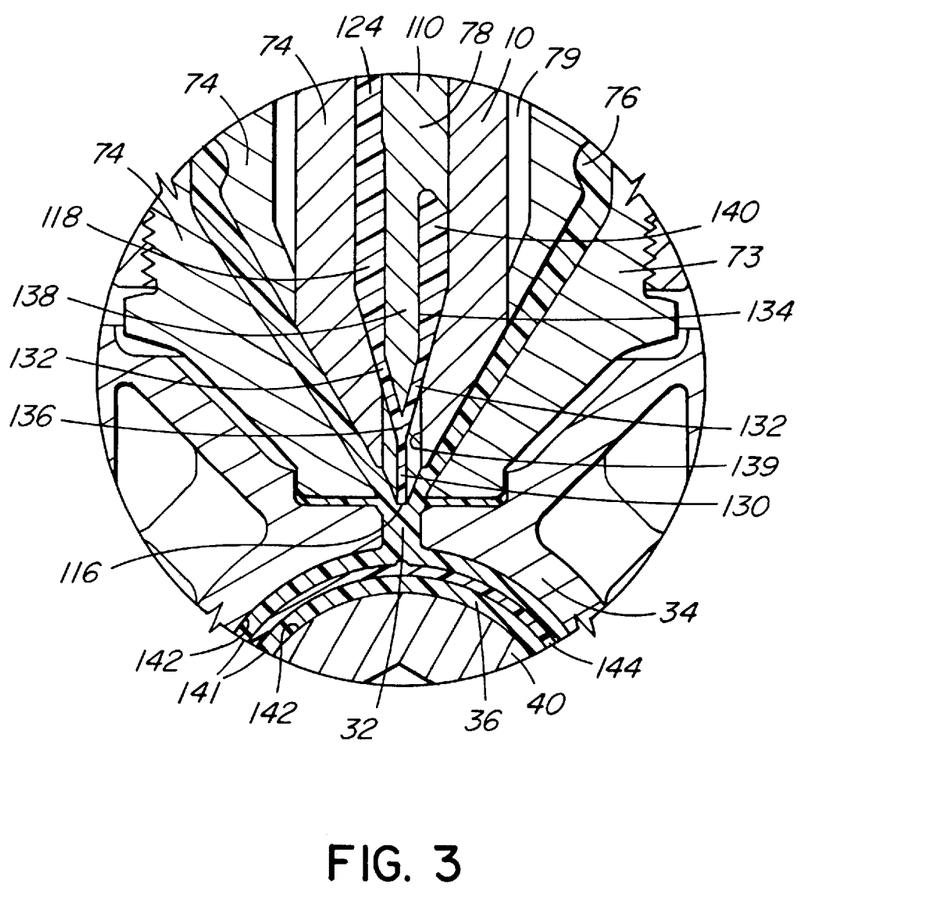
FIG. 3 is an enlarged sectional view showing the melt flow through the central melt bore in the front end of the elongated pin seen in FIG. 1.
Figure 4:
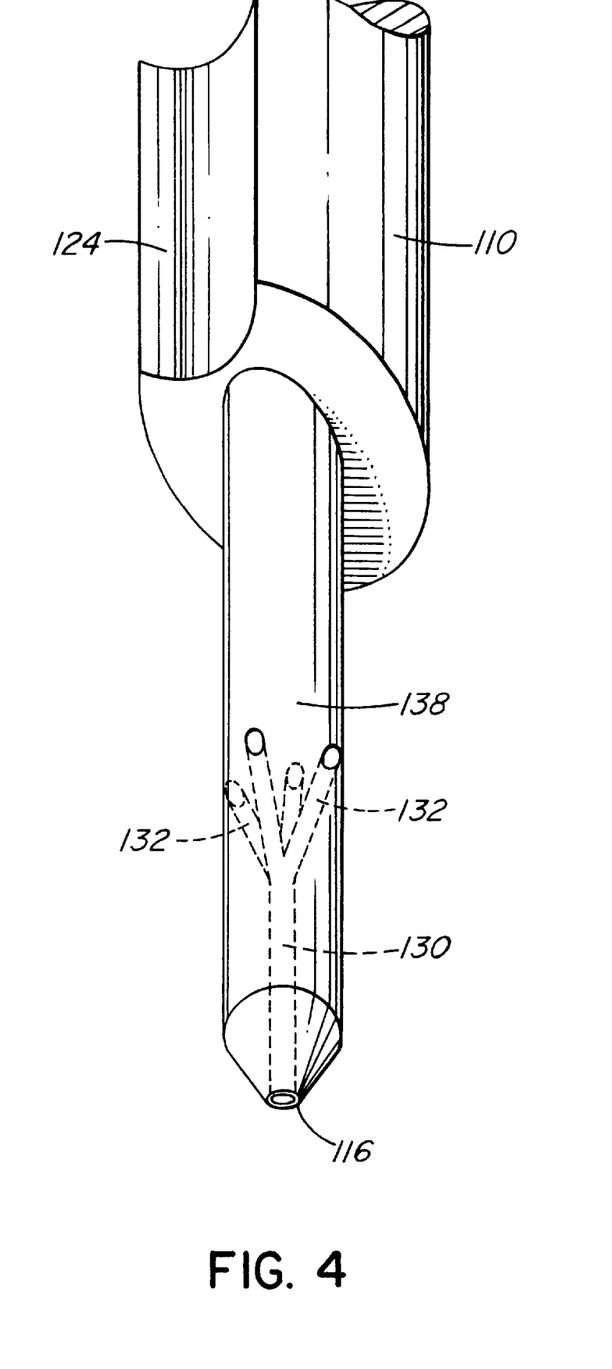
FIG. 4 is an isometric view showing a front portion of the elongated pin seen in FIG. 1.

As best seen in FIGS. 3 and 4, each fixed pin 110 has a central melt bore 130 extending rearwardly from its front end 116 to four lateral melt bores 132 extending outwardly to the outer surface 134 of the fixed pin 110. The lateral melt bores 132 extend diagonally outward from the rear end 136 of the central melt bore 130 to the outer surface 134. In this embodiment, each fixed pin 110 has a reduced diameter portion 138 which extends forwardly from the front end of the longitudinal groove 124 to its front end 116 and fits in a reduced diameter portion 139 of the central melt channel 78 through the heated nozzle 10. The reduced diameter portion 138 of the fixed pin 110 is longer than the reduced diameter portion 139 of the central melt channel 78 which thus forms a space 140 around the reduced diameter portion 138 of the fixed pin 110. Thus, the barrier material melt passage 118 extends from the longitudinal groove 124 in each fixed pin 110 into this space 140 and then inwardly through the lateral melt bores 132 and forwardly through the central melt bore 130 to the gate 32 leading to the cavity 36. In other embodiments, the fixed pin 110 can have one or a different number of lateral bores extending inwardly from the front end of the longitudinal groove 124 to the rear end 136 of the central melt bore 130.

In use, the injection molding system is assembled as shown in FIGS. 1 and 2 and operates to form three layer preforms or other products as follows. First, electrical power is applied to the heating element 86 in the front melt distribution manifold 18 and the heating elements 58 in the heated nozzles 10 to heat them to an operating temperature of about 565° F. Electrical power is also applied to the heating element 100 in the rear melt distribution manifold 94 to heat it to an operating temperature of about 400° F. Water is supplied to the cooling conduits 68 to cool the mold 12 and the gate inserts 34. Hot pressurized melt is then injected from separate injection cylinders (not shown) into the first and second melt passages 42, 118 through inlets 44, 120 according to a predetermined cycle. The melt injected into the first melt passage 42 is a polyethylene terephthalate (PET) type material. The first melt passage 42 branches in the front melt distribution manifold 18 and extends to each melt dividing bushing 48 where it divides into the four spaced holes 84 aligned with the four melt bores 80 in the rear end 14 of the heated nozzle 10. It then extends from these four spaced melt bores 80 through the annular melt channel 76 to the gate 32.

The melt injected into the second melt passage 118 is a suitable barrier material such as ethylene vinyl copolymer (EVOH) or nylon. The second melt passage 118 branches in the rear melt distribution manifold 94 and extends through the aligned passage 122 in each melt transfer bushing 98 and the aligned longitudinal or helical groove 124 in each fixed pin 110 which extends through the central bore 108 in the melt transfer bushing 98, the central bore 106 in the melt dividing bushing 48 and the central melt channel 78 in the heated nozzle 10 into the space 140 around the reduced diameter portion 138 of each fixed pin 110. The second melt passage 118 then extends through the lateral bores 132 and the central melt bore 130 in each fixed pin 110 leading to the aligned gate 32.

During each cycle, a predetermined quantity of PET is injected through the first melt passage 42 and outer layers 141 of it adhere to the sides 142 of the cavity 36. A short period of time after the start of PET injection, a predetermined quantity of the less viscous barrier material is then simultaneously injected through the second melt passage 118 and forms a central layer 144 between the two outer layers 141 of PET. When the cavities 36 are almost filled, the injection pressure of the barrier material is released which stops its flow and the PET injection is continued to completely fill the cavities 36. Injection pressure of the PET is then released and, after a short cooling period, the mold 12 is opened for ejection.

After ejection, the mold 12 is closed and the cycle is repeated continuously every 15 to 30 seconds with a frequency depending upon the wall thickness and number and size of cavities 36 and the exact materials being molded. The central location of the central melt bore 130 at the front end 30 of the fixed pin 110 and the relatively small size of the groove 124 and the central melt bore 130 combine with the relatively low volume and low viscosity of the barrier material to ensure that the flow of the barrier material is reliable and a very thin layer of the barrier material can be provided.

Figure 5:
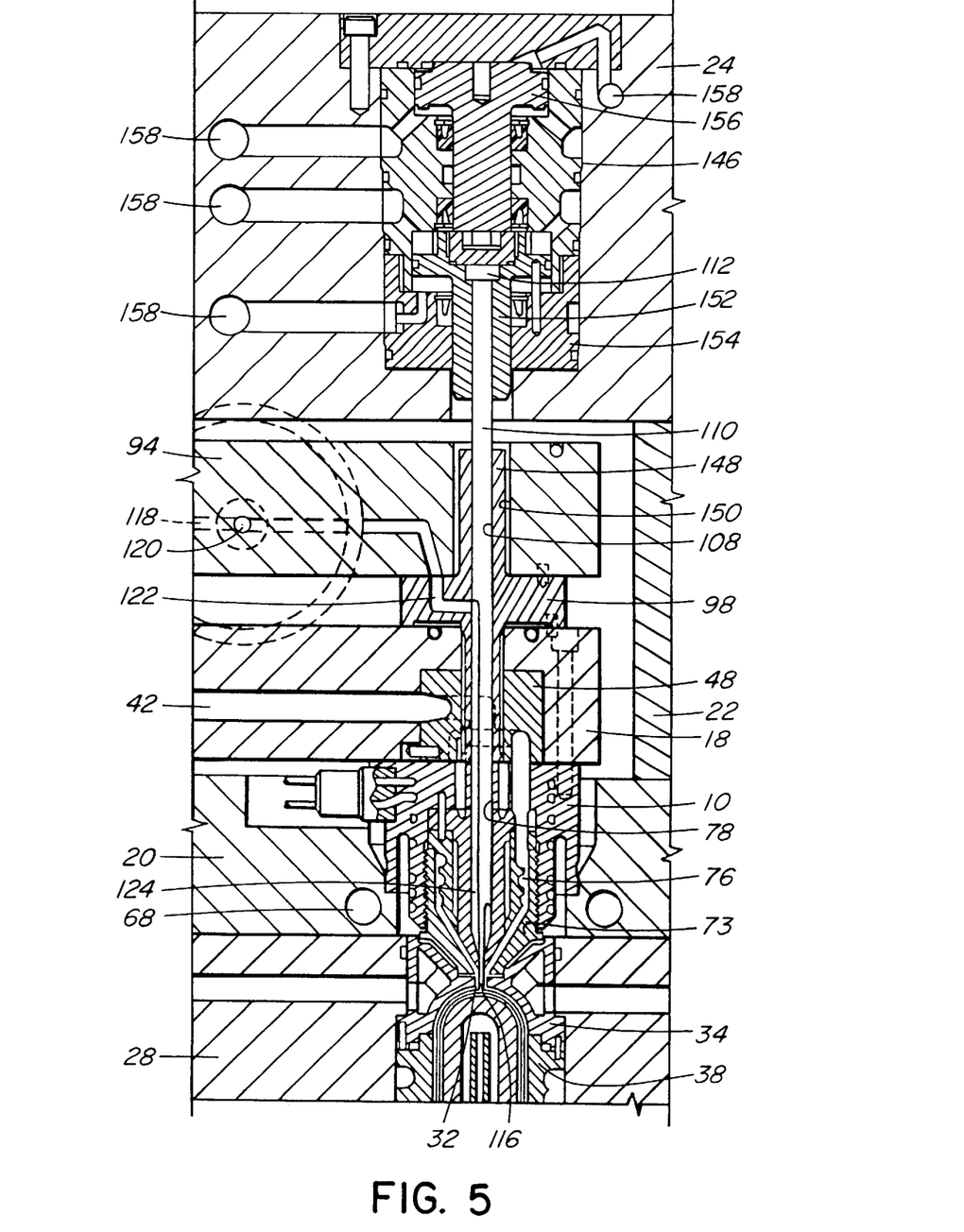
FIG. 5 is a sectional view of a portion of a multi-cavity injection molding apparatus having valve gating elongated pins according to another embodiment of the invention.
Figure 6:
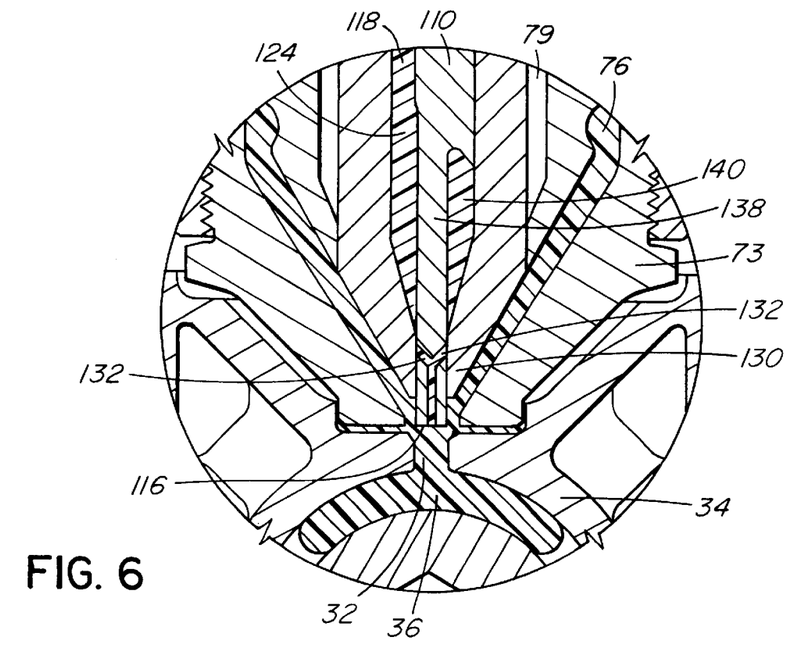
FIG. 6 is an enlarged sectional view showing the valve pin seen in FIG. 5 in the middle position.
Figure 7:
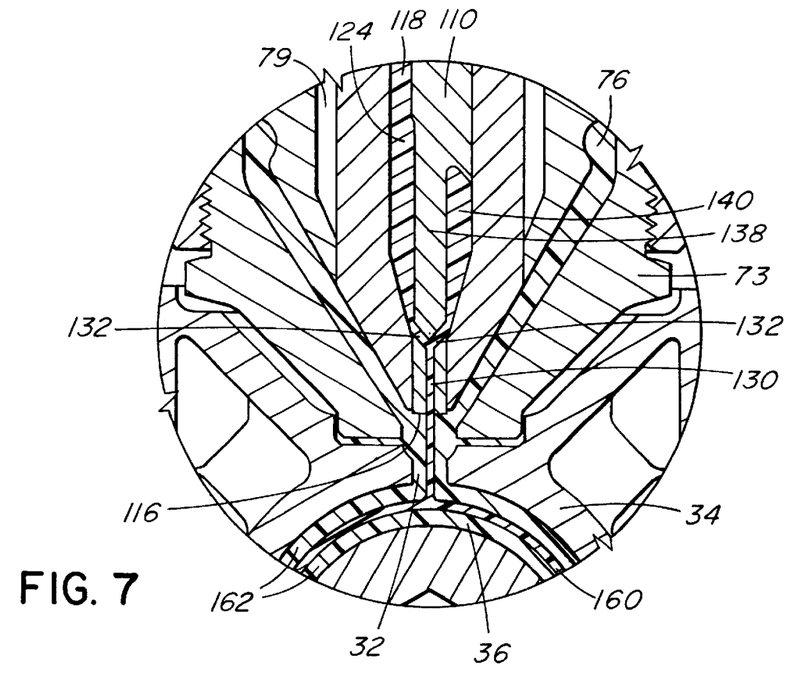
FIG. 7 is a similar view to FIG. 6 showing the valve pin in the open position.

Reference is now made to FIGS. 5–7 showing injection molding apparatus according to another embodiment of the invention for molding three layer preforms or other products by a combination of sequential and simultaneous coinjection. As many of the elements are the same as described above, not all the elements common to both embodiments are described and those that are described again have the same reference numerals as before. In this embodiment, the apparatus has valve gates rather than sprue gates with fixed pins. Each elongated valve pin 110 has the same shape except that its front end 116 is cylindrical rather than partially tapered. The elongated valve pin 110 is reciprocated in the central melt channel 78 in each heated nozzle 10 by hydraulic actuating mechanism 146 according to a predetermined cycle. In this case, the thermal insulating melt transfer bushing 98 also has a neck portion 148 extending rearwardly through an opening 150 in the rear melt distribution manifold 94, and the central bore 108 extends through this rear neck portion 148. Each elongated valve pin 110 fits in the central bore 108 in the melt transfer bushing 98 which is aligned with the central melt channel 78 in the heated nozzle 10 tightly enough to prevent melt leakage around the elongated valve pin 110 as it reciprocates. The head 112 of the elongated valve pin 110 is connected to a front piston 152 seated in a cylinder 154 in the back or cylinder plate 24. The actuating mechanism 146 also includes a rear piston 156, and the two pistons 152, 156 are driven by controlled oil pressure applied through ducts 158 to reciprocate the valve pin 110 between three different positions. While hydraulic actuating mechanisms 146 are shown for ease of illustration, of course other types of actuating mechanisms such as electromechanical mechanisms can be used for other applications.

In the first or middle position shown in FIG. 6, the front end 116 of each valve pin 110 is retracted only far enough and long enough to allow a small quantity of PET to flow through the annular melt channel 76. In this embodiment, there is a double blockage of the flow of the barrier material in this middle position. As seen in FIG. 6, the lateral melt bores 132 in the valve pin 110 are too far forward to connect with the space 140 around the reduced diameter portion 138 of the valve pin 110. Furthermore, as seen in FIG. 5, the longitudinal or helical groove 124 in the valve pin 110 does not extend far enough rearwardly to connect with the L-shaped passage 122 in the head portion 103 of the melt transfer bushing 98 in this position.

In other embodiments, it may only be necessary to use one or the other of these ways of blocking the flow of barrier material. Then, the front end 116 of each valve pin 110 is retracted further to a second or open position shown in FIG. 7. In this position, the lateral melt bores 132 in the valve pin 110 are connected with the space 140 around the reduced diameter portion 138 of each valve pin 110 and the groove 124 in the valve pin 110 does connect with the L-shaped passage 122 in the melt transfer bushing 98 which allows the barrier material to flow through the melt passage 118 into the cavities 36.

As mentioned above, the central location of the central melt bore 130 at the front end 30 of the fixed pin 110 and the relatively small size of the groove 124 and the central melt bore 130 combine with the relatively low volume and low viscosity of the barrier material to ensure that the flow of the barrier material is reliable to provide a uniform and very thin layer of the barrier material, which is quite an expensive material. As seen in FIG. 7, the barrier material flowing simultaneously with the PET splits the PET flow in two and provides a central layer 160 of the barrier material between two outer layers 162 of PET. When the cavities 36 are almost filled, the front end of each valve member 110 is returned to the first position closing off the flow of the barrier material through the central melt bore 130. The flow of PET through the annular melt channel 76 continues until the cavities 36 are completely filled. Each valve pin 110 is then driven to the third or forward closed position in which its front end 116 is seated in the gate 32 flush with the cavity 36. After a short cooling period, the mold is opened for ejection. After ejection, the mold is closed and the cycle is repeated continuously every 15 to 30 seconds with a frequency depending upon the wall thickness and number and size of cavities 36 and the exact materials being molded.

Reference is now made to FIGS. 8–11 showing injection molding apparatus according to another embodiment of the invention for molding three layer preforms or other products by a combination of sequential and simultaneous coinjection to sprue gates. In this case, the rear melt distribution manifold 94 rather than the front melt distribution manifold 18 has the manifold extension 46. Thus, the first melt passage 42 for the PET extends from the common inlet 44 in the manifold extension 46 extends through the rear melt distribution manifold 94 rather than the front melt distribution manifold 18. Furthermore, the second melt passage 118 for the barrier material extends from the second inlet 120 through the front melt distribution manifold 18 rather than the rear melt distribution manifold 94.

Figure 8:
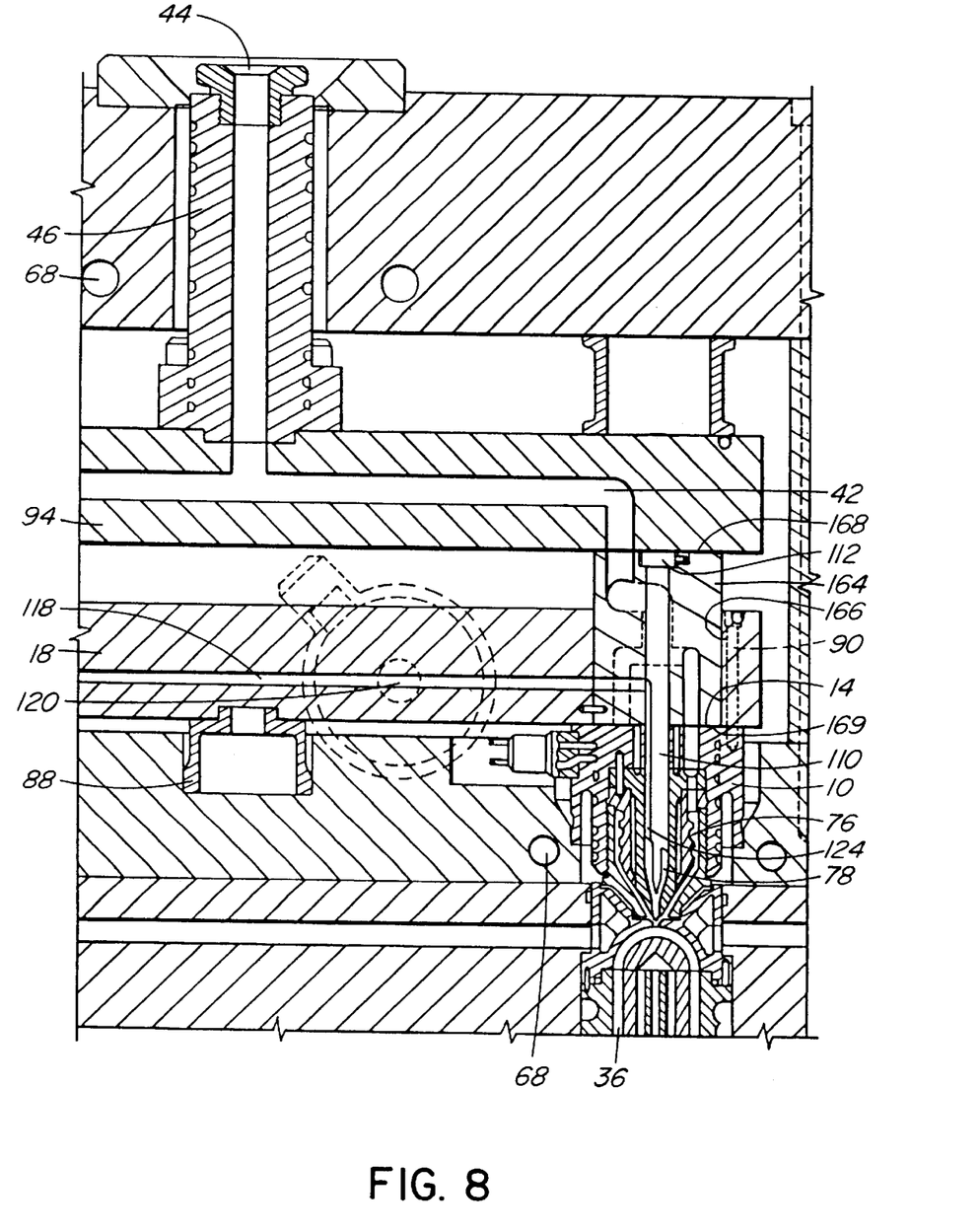
FIG. 8 is a sectional view of a portion of a multi-cavity injection molding apparatus having sprue gating with fixed elongated pins according to a further embodiment of the invention.

As can be seen, a melt transfer and dividing bushing 164 is seated behind each heated nozzle 10 in a cylindrical opening 166 through the front melt distribution manifold 18 with its rear end 168 abutting against the rear melt distribution manifold 94. The rear end 14 of each of the heated nozzles 10 abuts against the front end 169 of one of the melt transfer and dividing bushings 164 as well as against the front melt distribution manifold 18. Each fixed pin 110 has a central melt bore 130 and four lateral melt bores 132 as shown in FIG. 3.

Figure 9:
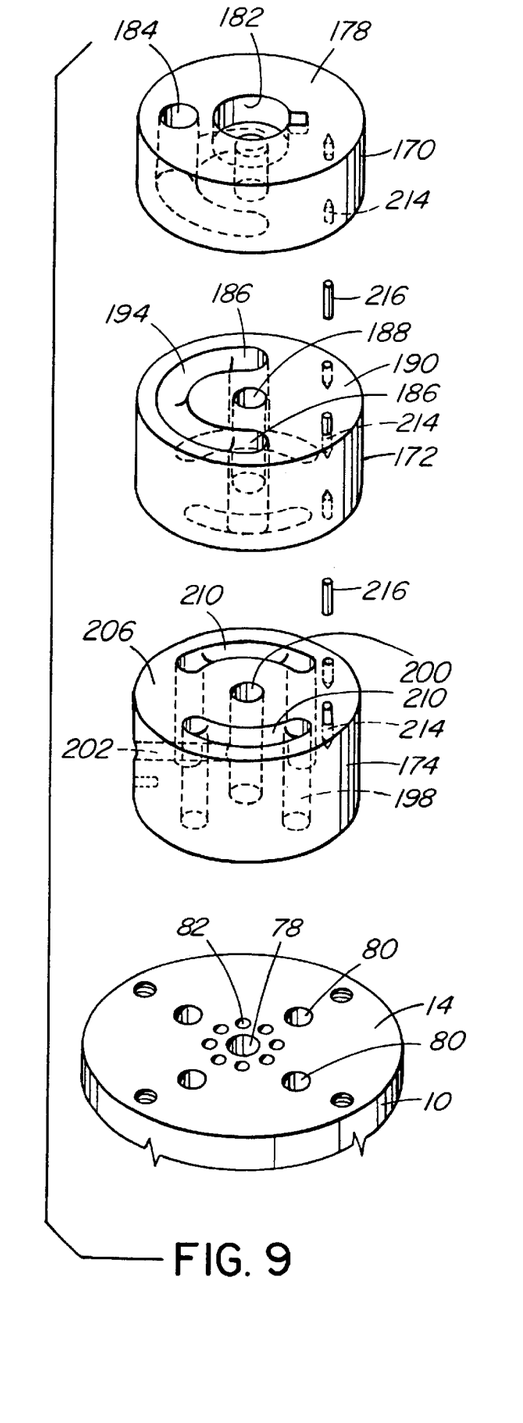
FIG. 9 is an exploded isometric view showing the three layers of the melt transfer and dividing bushing as seen in FIG. 8 before they are integrally joined together.
Figure 10:
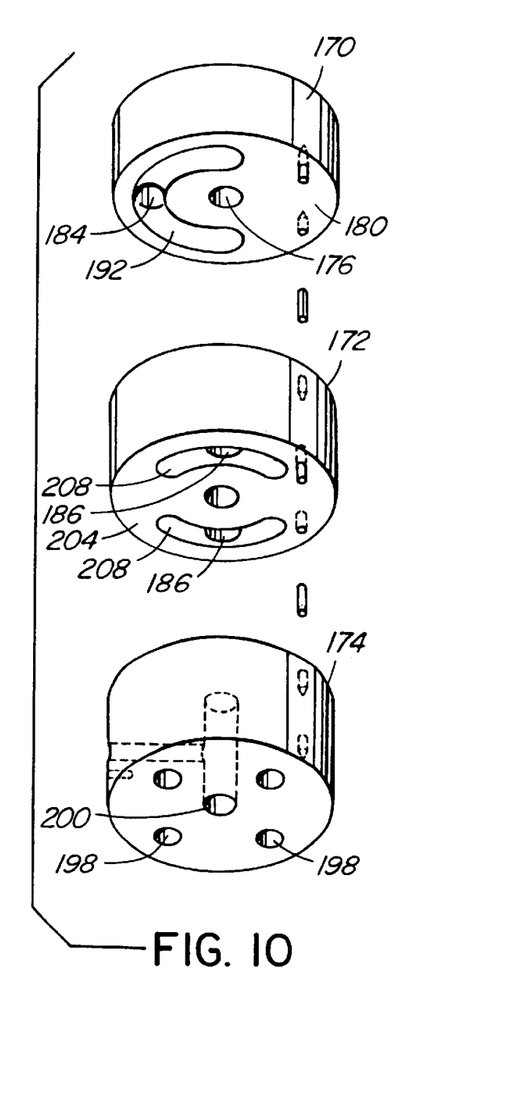
FIG. 10 is a similar view showing the other faces of the three layers of the same melt transfer and dividing bushing.
Figure 11:
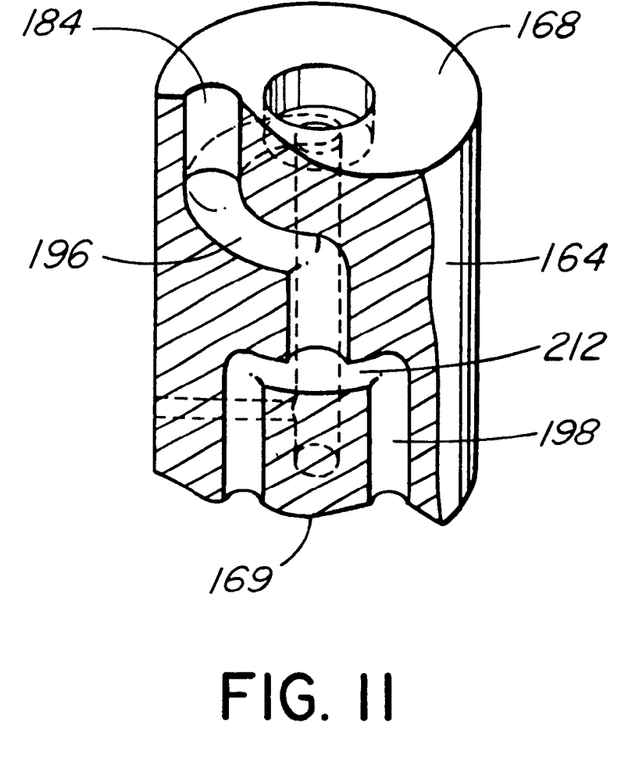
FIG. 11 is a cut-away isometric view showing the melt conduits in the same melt transfer and dividing bushing.

Referring also to FIGS. 9–11, each of the melt transfer and dividing bushings 164 is made by integrally joining together first, second and third layers 170, 172, 174. The first layer 170 is machined to have a central hole 176 extending therethrough from its rear face 178 to its front face 180. The central hole 176 has a larger diameter portion 182 adjacent the rear face 178 to receive the head 112 of the fixed pin 110. The first layer 170 is drilled to also have an off-center hole 184 extending therethrough. The second layer 172 is drilled to have two holes 186 spaced on opposite sides of a central hole 188 extending therethrough. The front face 180 of the first layer 170 and the rear face 190 of the second layer 172 are machined to have matching grooves 192, 194 which join when the three layers 170, 172, 174 are joined together to form a first curved melt conduit 196 which branches from the off-centre hole 184 through the first layer 172 to the two spaced holes 186 through the second layer 172.

The third layer 174 is drilled to have four holes 198 spaced around a central hole 200 which is aligned with the central melt channel 78 in the aligned heated nozzle 10. Each of the four spaced holes 198 are in alignment with one of the four spaced melt bores 80 extending from the rear end 14 of the heated nozzle 10 to the annular melt channel 76. The third layer 174 is drilled to also have a radial bore 202 extending to the central hole 200 in alignment with the second melt passage 118 in the front melt distribution manifold 18. The front face 204 of the second layer 172 and the rear face 206 of the third layer 174 are machined to each have a pair of matching grooves 208, 210 which join when the three layers 170, 172, 174 are joined together to form a pair of second curved melt conduits 212. Each second curved melt conduits 212 branches from one of the two spaced holes 186 through the second layer 172 to two of the four spaced holes 198 through the third layer 174 in alignment with the four melt bores 80 extending from the rear end 14 of the heated nozzle 10 to the annular melt channel 76. The three layers 170, 172, 174 are also drilled to have holes 214 to receive alignment dowels 216.

A quantity of nickel alloy (not shown) is applied to the front face or faces 180 of the first layer 170 and the front face 204 of the second layer 172 and the three layers 170, 172, 174 are assembled together with the dowels 216 keeping them in proper alignment. The assembled layers 170, 172, 174 are then loaded into a vacuum furnace and gradually heated to a temperature of approximately 925° F. which is above the melting temperature of the nickel alloy. As the furnace is heated, it is evacuated to a relatively high vacuum to remove substantially all of the oxygen and then partially backfilled with an inert gas such as argon or nitrogen. When the melting point of the nickel alloy is reached, the nickel alloy melts and flows by capillary action between the first layer 170, the second layer 172 and the third layer 174 to integrally braze them together to form an integral melt transfer and dividing bushing 164.

The use of the injection molding system shown in FIG. 8 is essentially the same as that described above in regard to FIGS. 1–4, except that the rear melt distribution manifold 94 and the heated nozzles 10 are heated to an operating temperature of about 565° F. and the front melt distribution manifold is heated to an operating temperature of about 400° F. Also, the PET type material is injected into the first passage 42 which branches in the rear melt distribution manifold 94 and extends through each melt transfer and dividing bushing 164 to the annular melt channel 76 in the aligned heated nozzle 10. The barrier material is now injected into the second melt passage 118 which branches in the front melt distribution manifold and extends through the radial bore 202 and along the groove 124 in each fixed pin 110.

While the description of the three layer injection molding apparatus having elongated pins 110 with central melt bores 130 at their front ends 116 has been given with respect to fixed gate and valve gate embodiments, it will be evident that other various modifications are possible without departing from the scope of the invention as understood by those skilled in the art and as defined in the following claims. For instance, materials having suitable characteristics can be used rather than PET and EVOH or nylon.

The embodiments of the invention in which an exclusive property or privilege is claimed is defined as follows:

1. A method of continuously injection molding three layer products in a multi-cavity injection molding apparatus having a front melt distribution manifold spaced from a rear distribution manifold with a plurality of heated nozzles mounted in a mold, each heated nozzle having a rear end abutting against the front melt distribution manifold and a front end adjacent a gate leading to a cavity in the mold, each heated nozzle having a central melt channel extending therethrough from the rear end to the front end and an annular melt channel extending around the central melt channel to the front end, an elongated pin having a rear end, a front end and an outer surface extending in the central melt channel in each heated nozzle in alignment with the gate leading to the cavity in the mold, each pin having a central melt bore extending rearwardly from its front end to a plurality of lateral melt bores which extend outwardly to the outer surface of the pin, comprising the steps of:

(a) injecting a first molten material from a first melt source into the cavities through a first melt passage which branches in the front melt distribution manifold and extends through the annular melt channel in each heated nozzle through the gate, (b) after a predetermined quantity of the first molten material has been injected into the cavities, simultaneously injecting a second molten material from a second melt source into the cavities through a second melt passage, which branches in the rear melt distribution manifold, and flowing the second molten material along each elongated pin through the central melt channel of each of the heated nozzles, and then flowing the second molten material to the gates through the lateral melt bores and then through the central melt bore of each pin to form an inner layer of the second material between two outer layers of the first material in each of the cavities, (c) when the cavities are nearly full, discontinuing the injection of the second material through the second melt passage, while continuing the injection of the first material through the first melt passage until the cavities are full, (d) after a cooling period, opening the mold and ejecting the molded products, and (e) closing the mold after ejection of the molded products.

2. A method of injection molding as claimed in claim 1 wherein the elongated pin in the central melt channel in each nozzle is a valve pin and is first retracted to a partially open position allow the injection of the first molten material in step (a), then fully retracted to a fully open position to allow simultaneous injection of the first and second materials in step (b), then returned to the partially open position to allow injection of the first molten material to continue until the cavities are full, and finally reciprocated to a closed position wherein the front end of the valve pin is seated in the gate.

3. A method of injection molding as claimed in claim 1 wherein the first material is polyethylene terephthalate (PET).

4. A method of injection molding as claimed in claim 3 wherein the second material is ethylene vinyl alcohol copolymer (EVOH).

5. A method of injection molding as claimed in claim 3 wherein the second material is nylon.

6. A method according to claim 1, wherein said pin has a larger diameter portion and a reduced diameter portion extending in front of the larger diameter portion, the reduced diameter portion having the central and lateral melt bores.

7. A method according to claim 6, wherein the larger diameter portion has a groove extending along its length to allow passage of the second molten material to flow along the central melt channel, and then to flow along the reduced diameter portion.

8. A method according to claim 7, wherein the groove is longitudinal.

9. A method according to claim 7, wherein the groove is helical.

10. A method of injecting two materials into a mold cavity through an injection nozzle located in a hot runner mold comprising the steps of:

(a) directing a first molten material to a first melt channel formed in the injection nozzle to form an annular stream of said first molten material within the injection nozzle, (b) injecting only a certain amount of said annular stream of said first molten material into said cavity, (c) directing a second molten material into a second melt channel formed in the injection nozzle, and flowing the second molten material along said second melt channel, and dividing the second molten material in said second melt channel into a plurality of separate streams after the second molten material flows along said second melt channel, and then combining said separate streams into a single central stream within the injection nozzle and flowing the second molten material toward the cavity centrally of the annular stream of said first molten material, (d) simultaneously injecting both of said molten materials into the cavity, and (e) discontinuing injection of said second molten material and injecting only said first molten material until the cavity is full, thereby forming a multi-layered product of said first material and said second material.

11. A method according to claim 10, wherein said injection nozzle has a central pin positioned in the second melt channel, said central pin dividing and combining strains of the second molten material, the pin having a central melt bore extending rearwardly from its front end adjacent the cavity to a plurality of lateral melt bores which extend outwardly to an outer surface of the pin.

12. A method according to claim 11, wherein said pin has a larger diameter portion and a reduced diameter portion extending in front of the larger diameter portion, the reduced diameter portion having the central and lateral melt bores.

13. A method according to claim 12, wherein the larger diameter portion has a groove extending along its length to allow passage of the second molten material to flow along the second melt channel, and then to flow along the reduced diameter portion.

14. A method according to claim 13, wherein the groove is longitudinal.

15. A method according to claim 13, wherein the groove is helical.

16. A method of injecting different materials into a mold cavity through an injection nozzle, comprising the steps of:
    providing an annular melt channel in the injection nozzle;
    providing a central melt channel in the injection nozzle;
    providing a pin in the central melt channel, wherein a front portion of the pin has a central melt bore and lateral melt bores that communicate with the central melt bore and the central melt channel;
    flowing an annular stream of a first molten material through the annular melt channel;
    flowing a stream of second molten material through the central melt channel along the pin and then through the lateral melt bores to divide the second molten material into a plurality of separate streams, and then through the central melt bore to combine the separate streams into a single central stream;
    injecting the first molten material into the mold cavity;
    injecting the central stream of the second molten material flowing from the central melt bore into the mold cavity;
    simultaneously injecting both the first and second molten materials into the cavity; and
    injecting only the first molten material until the cavity is full, thereby forming a composite product of the first and second materials.

17. A method according to claim 16, wherein the pin has a larger diameter portion and a reduced diameter portion extending in front of the larger diameter portion, the reduced diameter portion having the central and lateral melt bores.

18. A method according to claim 17, wherein the larger diameter portion has a groove extending along its length to allow passage of the second molten material to flow along the central melt channel, and then to flow along the reduced diameter portion.

19. A method according to claim 18, wherein the groove is longitudinal.

20. A method according to claim 18, wherein the groove is helical.

* * * * *